US012753893B2

(12) United States Patent
Shiraishi et al.

(10) Patent No.: US 12,753,893 B2
(45) Date of Patent: Oct. 6, 2026

(54) VEHICLE LAMP FITTING

(71) Applicant: Stanley Electric Co., Ltd., Tokyo (JP)

(72) Inventors: Akihiro Shiraishi, Tokyo (JP); Shota Nishimura, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/149,324

(22) PCT Filed: Jan. 17, 2024

(86) PCT No.: PCT/JP2024/001102
§ 371 (c)(1),
(2) Date: Jul. 18, 2025

(87) PCT Pub. No.: WO2024/154751
PCT Pub. Date: Jul. 25, 2024

(65) Prior Publication Data

US 2026/0227043 A1 Aug. 6, 2026

(30) Foreign Application Priority Data

Jan. 18, 2023 (JP) ................................ 2023-006022

(51) Int. Cl.
*F21S 41/24* (2018.01)
*F21S 41/25* (2018.01)
(Continued)

(52) U.S. Cl.
CPC ............... *F21S 41/24* (2018.01); *F21S 41/25* (2018.01); *F21S 41/321* (2018.01);
(Continued)

(58) Field of Classification Search
CPC .......... F21S 41/24; F21S 41/25; F21S 41/635; F21S 41/322; F21S 41/321; F21S 41/43
See application file for complete search history.

(56) References Cited

U.S. PATENT DOCUMENTS

2009/0097268 A1* 4/2009 Mochizuki ............ F21S 41/365 362/538
2013/0272009 A1* 10/2013 Fujiu ....................... F21S 41/24 362/516
(Continued)

FOREIGN PATENT DOCUMENTS

JP 2017-212170 A 11/2017
JP 2022-94635 A 6/2022
WO 2018/043663 A1 3/2018

OTHER PUBLICATIONS

International Serch Report for PCT/JP2024/001102 mailed on Apr. 2, 2024.

*Primary Examiner* — Bryon T Gyllstrom
(74) *Attorney, Agent, or Firm* — Kenealy Vaidya LLP

(57) ABSTRACT

A vehicle lamp fitting includes: a projection lens; first luminous intensity distribution forming means for forming a first luminous intensity distribution corresponding to a low-beam light distribution pattern above a focal point of the projection lens; and second luminous intensity distribution forming means for forming a second luminous intensity distribution corresponding to a high-beam light distribution pattern below the focal point of the projection lens, in which the focal point of the projection lens is disposed in the vicinity of a lower edge of the first luminous intensity distribution, the projection lens forms the low-beam light distribution pattern and the high-beam light distribution pattern by projecting the first luminous intensity distribution and the second luminous intensity distribution, and the second luminous intensity distribution is formed closer to the projection lens than the first luminous intensity distribution.

10 Claims, 6 Drawing Sheets

(51) Int. Cl.
*F21S 41/32* (2018.01)
*F21S 41/43* (2018.01)
*F21S 41/63* (2018.01)
*F21W 102/135* (2018.01)

(52) U.S. Cl.
CPC ............. *F21S 41/322* (2018.01); *F21S 41/43* (2018.01); *F21S 41/635* (2018.01); *F21W 2102/135* (2018.01)

(56) References Cited

U.S. PATENT DOCUMENTS

| | | | | |
|---|---|---|---|---|
| 2017/0227184 | A1* | 8/2017 | Ishida | F21S 41/60 |
| 2019/0226658 | A1 | 7/2019 | Kawai et al. | |
| 2021/0010653 | A1* | 1/2021 | Hermitte | F21S 41/148 |
| 2022/0107066 | A1* | 4/2022 | Sato | F21S 41/29 |
| 2022/0136673 | A1* | 5/2022 | Dressler | F21S 41/143 362/516 |
| 2023/0043186 | A1* | 2/2023 | Zhu | F21S 41/255 |
| 2024/0019094 | A1* | 1/2024 | Muramatsu | F21S 41/143 |
| 2024/0302014 | A1* | 9/2024 | Zhu | F21S 41/147 |
| 2024/0392938 | A1* | 11/2024 | Sato | F21S 41/143 |
| 2025/0012422 | A1* | 1/2025 | Muramatsu | F21S 41/24 |
| 2025/0093005 | A1* | 3/2025 | Aichinger-Rosenberger | B60Q 1/08 |

* cited by examiner

VEHICLE LAMP FITTING

This application is a U.S. National Stage Application under 35 U.S.C § 371 of International Patent Application No. PCT/JP2023/001102 filed Jan. 17, 2024, which claims the benefit of priority under 35 U.S.C. § 119 to Japanese Patent Application No. 2023-006022 filed Jan. 18, 2023, the disclosures of all of which are hereby incorporated by reference in their entireties.

TECHNICAL FIELD

The present disclosure relates to a vehicle lamp fitting.

BACKGROUND ART

There is known a vehicle lamp fitting that is capable of simultaneously forming a low-beam light distribution pattern and a high-beam light distribution pattern and is configured to reduce a dark portion generated between the low-beam light distribution pattern and the high-beam light distribution pattern (see, for example, Patent Literature 1).

CITATION LIST

Patent Literature

Patent Literature 1: International Patent Publication No. WO 2018/043663

SUMMARY OF INVENTION

Technical Problem

However, in a vehicle lamp fitting described in Patent Literature 1, the dark portion is reduced by using a low-beam light guide lens and a high-beam light guide lens disposed below the low-beam light guide lens, and light exiting from the high-beam light guide lens is transmitted through a part of the low-beam light guide lens. Therefore, there is a problem that a light loss (Fresnel loss) when the light exiting from the high-beam light guide lens is transmitted through a part of the low-beam light guide lens is large, and the maximum luminous intensities of the low-beam light distribution pattern and the high-beam light distribution pattern (combined light distribution pattern) formed at the same time decreases.

The present disclosure has been made to solve such a problem, and an object of the present disclosure is to provide a vehicle lamp fitting capable of reducing a dark portion between a low-beam light distribution pattern and a high-beam light distribution pattern while preventing light exiting from a high-beam light guide lens from passing through a part of a low-beam light guide lens.

Solution to Problem

A vehicle lamp fitting according to the present disclosure includes: a projection lens; first luminous intensity distribution forming means for forming a first luminous intensity distribution corresponding to a low-beam light distribution pattern above a focal point of the projection lens; and second luminous intensity distribution forming means for forming a second luminous intensity distribution corresponding to a high-beam light distribution pattern below the focal point of the projection lens, in which the focal point of the projection lens is disposed in a vicinity of a lower edge of the first luminous intensity distribution, the projection lens projects the first luminous intensity distribution and the second luminous intensity distribution to form the low-beam light distribution pattern and the high-beam light distribution pattern, and the second luminous intensity distribution is formed closer to the projection lens than the first luminous intensity distribution such that a lower end portion of the high-beam light distribution pattern overlaps with an upper end portion of the low-beam light distribution pattern.

With such a configuration, it is possible to provide the vehicle lamp fitting capable of reducing a dark portion between the low-beam light distribution pattern and the high-beam light distribution pattern while preventing light exiting from a high-beam light guide lens from passing through a part of a low-beam light guide lens.

This is because a high-beam light exiting surface (second luminous intensity distribution) is disposed closer to the projection lens than a low-beam light exiting surface (first luminous intensity distribution).

In the vehicle lamp fitting, the first luminous intensity distribution may have a relatively high luminous intensity in the vicinity of a lower edge of the first luminous intensity distribution, and the second luminous intensity distribution may have a relatively high luminous intensity in the vicinity of an upper edge of the second luminous intensity distribution.

In the vehicle lamp fitting, the lower edge of the first luminous intensity distribution may include a cutoff shape corresponding to a cutoff line which is an upper edge of the low-beam light distribution pattern, and the upper edge of the second luminous intensity distribution may include a cutoff shape corresponding to a cutoff line which is a lower edge of the high-beam light distribution pattern.

Further, in the vehicle lamp fitting, the first luminous intensity distribution forming means may be a low-beam light guide lens including a low-beam light exiting surface disposed above the focal point of the projection lens, and a low-beam light guide part configured to guide first light exiting from the low-beam light exiting surface to the low-beam light exiting surface, the first luminous intensity distribution may be formed on the low-beam light exiting surface by the first light exiting from the low-beam light exiting surface, the second luminous intensity distribution forming means may be a high-beam light guide lens including a high-beam light exiting surface disposed below the focal point of the projection lens, and a high-beam light guide part configured to guide second light exiting from the high-beam light exiting surface to the high-beam light exiting surface, the second luminous intensity distribution may be formed on the high-beam light exiting surface by the second light exiting from the high-beam light exiting surface, and the high-beam light exiting surface may be disposed closer to the projection lens than the low-beam light exiting surface.

In the vehicle lamp fitting, the low-beam light guide part may include a lower surface that is a total reflection surface extending rearward from a lower edge of the low-beam light exiting surface, and the high-beam light guide part may include an upper surface that is a total reflection surface extending rearward from an upper edge of the high-beam light exiting surface.

The vehicle lamp fitting may further include: a low-beam light source disposed behind the low-beam light guide lens and configured to emit the first light; and a high-beam light source disposed behind the high-beam light guide lens and configured to emit the second light, in which the low-beam light guide lens further includes a low-beam light entrance part which faces the low-beam light source and into which the first light emitted by the low-beam light source enters, the high-beam light guide lens further includes a high-beam light entrance part which faces the high-beam light source and into which the second light emitted by the high-beam light source enters, the low-beam light entrance part is configured such that the first light entering the low-beam light guide lens from the low-beam light entrance part is condensed toward the lower surface of the low-beam light guide part, and the high-beam light entrance part is configured such that the second light entering the high-beam light guide lens from the high-beam light entrance part is condensed toward the upper surface of the high-beam light guide part.

Further, in the vehicle lamp fitting, the lower edge of the low-beam light exiting surface may have a shape corresponding to a cutoff line which is an upper edge of the low-beam light distribution pattern, and the upper edge of the high-beam light exiting surface may have a shape corresponding to a cutoff line which is a lower edge of the high-beam light distribution pattern.

In the vehicle lamp fitting, at least one of the first luminous intensity distribution forming means and the second luminous intensity distribution forming means may be a matrix light source including a semiconductor light emitting element group.

In the vehicle lamp fitting, at least one of the first luminous intensity distribution forming means and the second luminous intensity distribution forming means may be a screen member in which the luminous intensity distribution is formed by light with which scanning is performed by an optical deflector.

In the vehicle lamp fitting, at least one of the first luminous intensity distribution forming means and the second luminous intensity distribution forming means may be a digital mirror device (DMD) including a micromirror group.

Advantageous Effects of Invention

According to the present disclosure, it is possible to provide the vehicle lamp fitting capable of reducing the dark portion between the low-beam light distribution pattern and the high-beam light distribution pattern while preventing light exiting from the high-beam light guide lens from passing through a part of the low-beam light guide lens.

DESCRIPTION OF EMBODIMENTS

Figure 1:
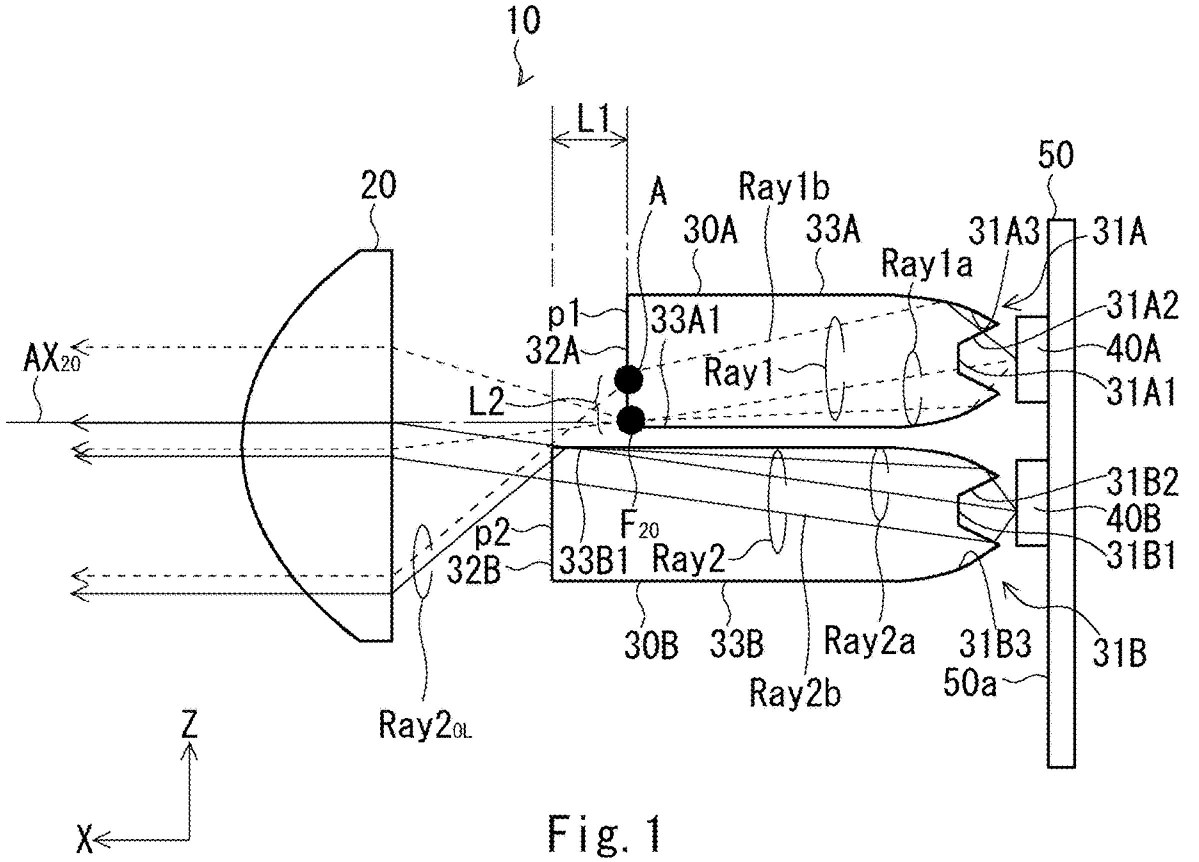
FIG. 1 is a schematic configuration view of a vehicle lamp fitting 10.

Hereinafter, a vehicle lamp fitting 10 according to an embodiment of the present disclosure will be described with reference to the accompanying drawings. In the drawings, corresponding components are denoted by the same reference numerals, and repeated descriptions are omitted.

FIG. 1 is a schematic configuration view of the vehicle lamp fitting 10.

The vehicle lamp fitting 10 of the present embodiment is a vehicle headlight that functions as a low-beam or high-beam headlamp, and is mounted on both left and right sides of a front end portion of a vehicle (not illustrated) such as an automobile. Since the vehicle lamp fitting 10 mounted on both the left and right sides has a symmetrical configuration, the vehicle lamp fitting 10 mounted on the right side (the right side when viewed from the front of the vehicle) of the front end portion of the vehicle will be described below as a representative.

As illustrated in FIG. 1, the vehicle lamp fitting 10 includes a projection lens 20, a low-beam light guide lens 30A which is an example of first luminous intensity distribution forming means according to the present disclosure, a high-beam light guide lens 30B which is an example of second luminous intensity distribution forming means according to the present disclosure, a low-beam light source 40A which is disposed behind the low-beam light guide lens 30A and emits first light Ray1, and a high-beam light source 40B which is disposed behind the high-beam light guide lens 30B and emits second light Ray2. For convenience of description, an X axis, a Y axis, and a Z axis are defined below. The X axis extends in a front-rear direction of the vehicle, the Y axis extends in a vehicle width direction, and the Z axis extends in a vertical direction.

The projection lens 20 is an aspherical lens. A focal point $F_{20}$ of the projection lens 20 is disposed in the vicinity of a lower edge of a low-beam light exiting surface 32A (first luminous intensity distribution p1) of the low-beam light guide lens 30A. An optical axis $AX_{20}$ of the projection lens 20 extends in an X-axis direction.

The low-beam light source 40A and the high-beam light source 40B are semiconductor light emitting elements such as light emitting diodes (LEDs).

Figure 2:
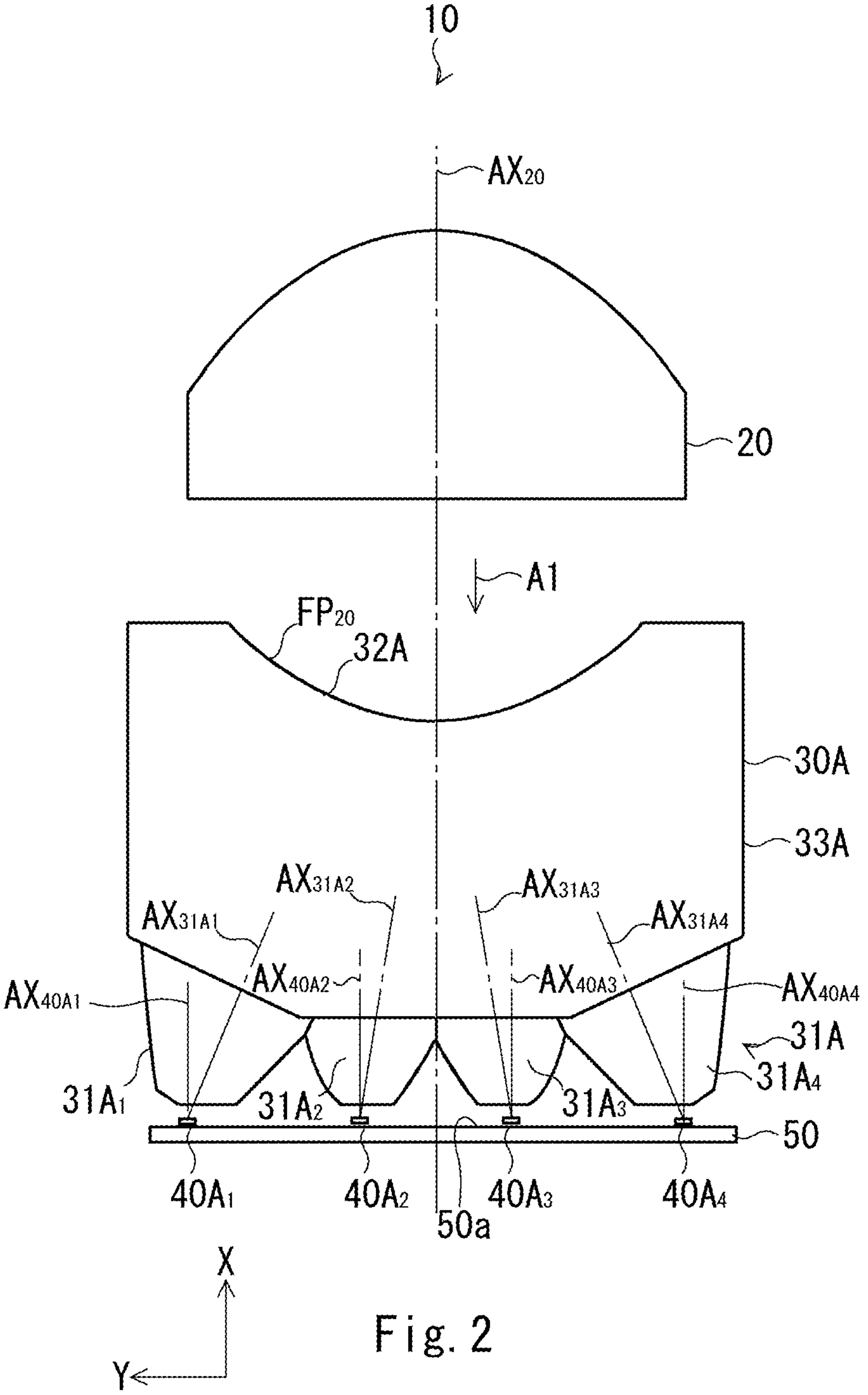
FIG. 2 is a horizontal cross-sectional view of the vehicle lamp fitting 10 taken along a horizontal plane passing through a low-beam light guide lens 30A.

FIG. 2 is a horizontal cross-sectional view of the vehicle lamp fitting 10 taken along a horizontal plane passing through the low-beam light guide lens 30A.

As illustrated in FIG. 2, in the present embodiment, four low-beam light sources 40$A_1$ to 40$A_4$ are mounted on an upper section of a substrate 50 (light source mounting surface 50*a*) in a state of being arranged in a line in a Y-axis direction at intervals. The number of low-beam light sources 40 is not limited to four and may be one or more. Hereinafter, the low-beam light sources 40$A_1$ to 40$A_4$ will be referred to as the low-beam light sources 40A unless otherwise distinguished.

Figure 3:
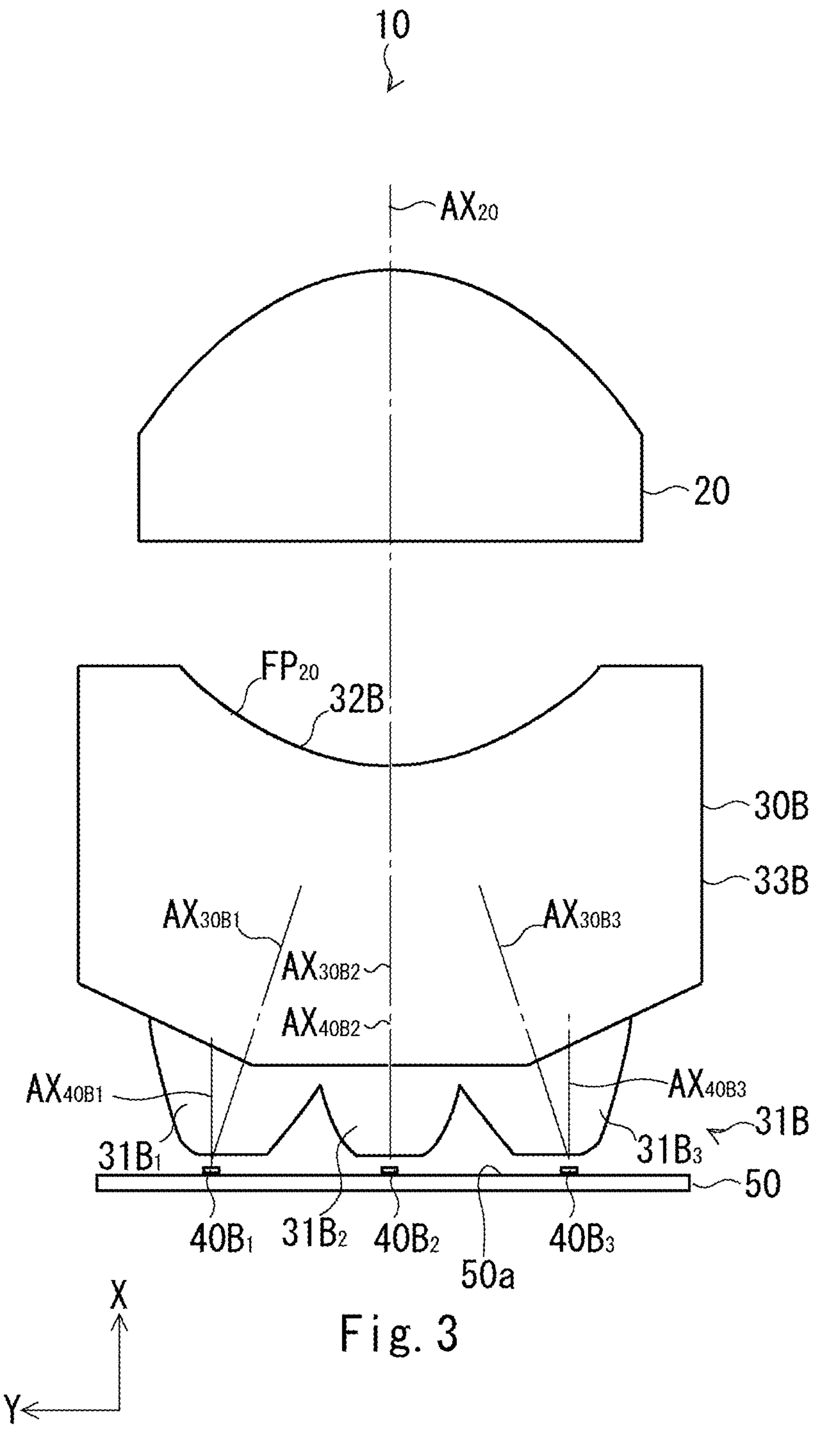
FIG. 3 is a horizontal cross-sectional view of the vehicle lamp fitting 10 taken along a horizontal plane passing through a high-beam light guide lens 30B.

FIG. 3 is a horizontal cross-sectional view of the vehicle lamp fitting 10 taken along a horizontal plane passing through the high-beam light guide lens 30B.

As illustrated in FIG. 3, in the present embodiment, three high-beam light sources 40$B_1$ to 40$B_3$ are mounted on a lower section of the substrate 50 (light source mounting surface 50*a*) in a state of being arranged in a line in the Y-axis direction at intervals. The number of high-beam light sources 40B is not limited to three and may be one or more. Hereinafter, the high-beam light source 40$B_1$ to 40$B_3$ will be referred to as the high-beam light sources 40B unless otherwise distinguished.

The low-beam light source 40A and the high-beam light source 40B each include a light emitting surface. The light emitting surface is, for example, a rectangular light emitting surface with each side measuring 1 mm. The low-beam light source 40 and the high-beam light source 40B are mounted on the substrate 50 (light source mounting surface 50*a*) in a state in which the light emitting surface is parallel to the light source mounting surface 50*a*. Optical axes $AX_{40A1}$ to $AX_{40A4}$ (see FIG. 2) of the low-beam light sources 40$A_1$ to 40$A_4$ each pass through the center of the light emitting surface and extend in a direction orthogonal to the light emitting surface. Similarly, optical axes $AX_{40B1}$ to $AX_{40B3}$ (see FIG. 3) of the high-beam light source 40$B_1$ to 40$B_3$ each pass through the center of the light emitting surface and extend in a direction orthogonal to the light emitting surface.

Next, the low-beam light guide lens 30A will be described.

As illustrated in FIG. 1, the low-beam light guide lens 30A is disposed above the focal point $F_{20}$ of the projection lens 20 (and the optical axis $AX_{20}$ of the projection lens 20). The low-beam light guide lens 30A includes a low-beam light entrance part 31A disposed on a vehicle rear side, the low-beam light exiting surface 32A disposed on a vehicle front side, and a low-beam light guide part 33A disposed between the low-beam light entrance part 31A and the low-beam light exiting surface 32A.

As illustrated in FIG. 2, low-beam light entrance parts 31$A_1$ to 31$A_4$ are arranged in a line in the Y-axis direction in a state of facing the low-beam light sources 40$A_1$ to 40$A_4$. Hereinafter, the low-beam light entrance parts 31$A_1$ to 31$A_4$ will be referred to as the low-beam light entrance parts 31A unless otherwise distinguished. The first light emitted by the low-beam light source 40$A_1$ enters the low-beam light guide lens 30A from the low-beam light entrance part 31$A_1$ facing the low-beam light source 40$A_1$. The same applies to light emitted by the low-beam light sources 40$A_2$ to 40$A_4$.

As illustrated in FIG. 1, the low-beam light entrance part 31A is a cap-type light entrance part including a central light entrance surface 31A1, a cylindrical peripheral light entrance surface 31A2 extending from an outer peripheral edge of the central light entrance surface 31Al toward the low-beam light source 40A, and a cylindrical peripheral reflection surface 31A3 disposed outside the peripheral light entrance surface 31A2. Although not illustrated, the low-beam light entrance part 31A may be a protruding light entrance part that protrudes toward the low-beam light source 40A.

A surface shape of the central light entrance surface 31A1 is formed (adjusted) such that at least partial light Ray1*a* (see FIG. 1) of the first light Ray1 (the light emitted by the low-beam light source 40A) entering from the central light entrance surface 31A1 is refracted and condensed toward a lower surface 33A1 of the low-beam light guide part 33A (condensed at least in a Z-axis direction). Similarly, surface shapes of the peripheral light entrance surface 31A2 and the peripheral reflection surface 31A3 are formed (adjusted) such that at least the partial light Rayla (see FIG. 1) of the first light Ray1 (the light emitted by the low-beam light source 40A) entering from the peripheral light entrance surface 31A2 and totally reflected by the peripheral reflection surface 31A3 is refracted and condensed toward the lower surface 33A1 of the low-beam light guide part 33A (condensed at least in the Z-axis direction).

At this time, as illustrated in FIG. 2, the low-beam light entrance parts 31$A_1$ to 31$A_4$ are arranged in a state in which optical axes $AX_{31A1}$ to $AX_{31A4}$ thereof are inclined with respect to a horizontal direction such that the first light Ray1 entering from each of the low-beam light entrance parts 31$A_1$ to 31$A_4$ is condensed in the vicinity of the optical axis $AX_{20}$ of the projection lens 20 in the horizontal direction.

As illustrated in FIG. 2, the low-beam light exiting surface 32A is curved along a rear focal plane $FP_{20}$ (field curvature) of the projection lens 20 in plan view. The low-beam light exiting surface 32A only needs to be curved along the rear focal plane $FP_{20}$ (field curvature) of the projection lens 20, and does not have to completely coincide with the rear focal plane $FP_{20}$ (field curvature) of the projection lens 20.

Figure 4:
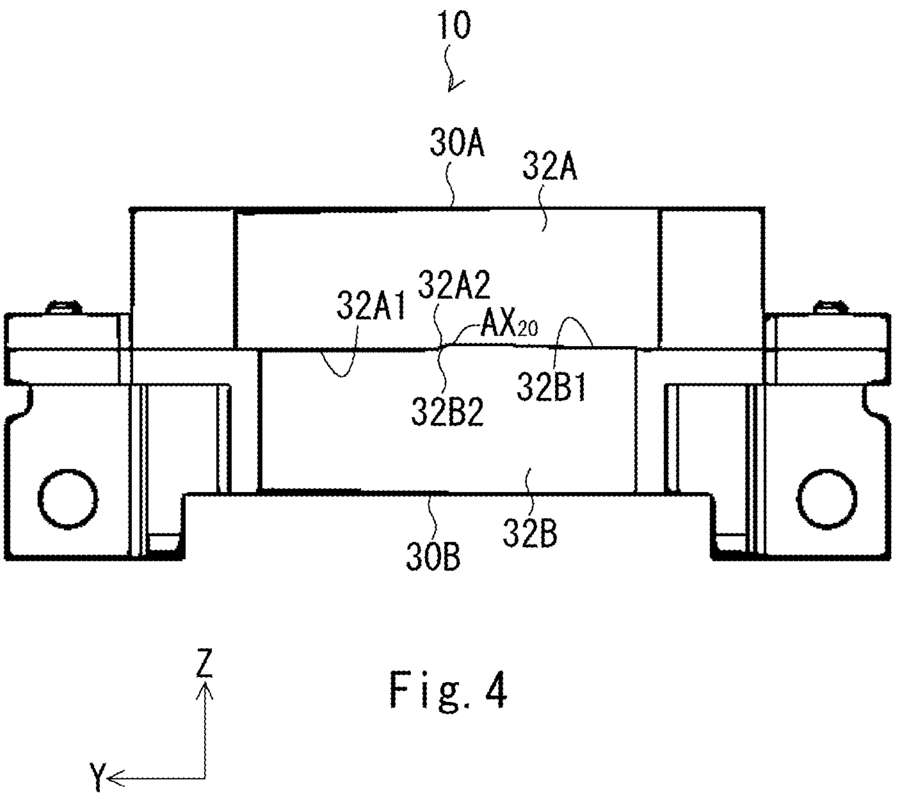
FIG. 4 illustrates the low-beam light guide lens 30A and the high-beam light guide lens 30B when viewed from a direction of an arrow A1 in FIG. 2.

FIG. 4 illustrates the low-beam light guide lens 30A and the high-beam light guide lens 30B when viewed from a direction of an arrow A1 in FIG. 2.

As illustrated in FIG. 4, a lower edge 32A1 of the low-beam light exiting surface 32A includes a cutoff shape 32A2 (Z-type step portion) corresponding to a cutoff line $CL_{Lo}$ (see FIG. 6A) which is an upper edge of a low-beam light distribution pattern $P_{Lo}$.

Next, the high-beam light guide lens 30B will be described.

As illustrated in FIG. 1, the high-beam light guide lens 30B is disposed below the focal point $F_{20}$ of the projection lens 20 (and the optical axis $AX_{20}$ of the projection lens 20). The high-beam light guide lens 30B includes a high-beam light entrance part 31B disposed on a vehicle rear side, a high-beam light exiting surface 32B disposed on a vehicle front side, and a high-beam light guide part 33B disposed between the high-beam light entrance part 31B and the high-beam light exiting surface 32B.

As illustrated in FIG. 3, high-beam light entrance parts 31$B_1$ to 31$B_3$ are arranged in a line in the Y-axis direction in a state of facing the high-beam light sources 40$B_1$ to 40$B_3$. Hereinafter, the high-beam light entrance parts 31$B_1$ to 31$B_3$ will be referred to as the high-beam light entrance parts 31B unless otherwise distinguished. The second light emitted by the high-beam light source 40$B_1$ enters the high-beam light guide lens 30B from the high-beam light entrance part 31$B_1$ facing the high-beam light source 40$B_1$. The same applies to light emitted by the high-beam light sources 40$B_2$ and 40$B_3$.

As illustrated in FIG. 1, the high-beam light entrance part 31B is a cap-type light entrance part including a central light entrance surface 31B1, a cylindrical peripheral light entrance surface 31B2 extending from an outer peripheral edge of the central light entrance surface 31B1 toward the high-beam light source 40B, and a cylindrical peripheral reflection surface 31B3 disposed outside the peripheral light entrance surface 31B2. Although not illustrated, the high-beam light entrance part 31B may be a protruding light entrance part that protrudes toward the high-beam light source 40B.

A surface shape of the central light entrance surface 31B1 is formed (adjusted) such that at least partial light Ray2*a* (see FIG. 1) of the second light Ray2 (the light emitted by the high-beam light source 40B) entering from the central light entrance surface 31B1 is refracted and condensed toward an upper surface 33B1 of the high-beam light guide part 33B (condensed at least in the Z-axis direction). Similarly, surface shapes of the peripheral light entrance surface 31B2 and the peripheral reflection surface 31B3 are formed (adjusted) such that at least the partial light Ray2*a* (see FIG. 1) of the second light Ray2 (the light emitted by the high-beam light source 40B) entering from the peripheral light entrance surface 31B2 and totally reflected by the peripheral reflection surface 31B3 is refracted and condensed toward the upper surface 33B1 of the high-beam light guide part 33B (condensed at least in the Z-axis direction).

At this time, as illustrated in FIG. 3, the high-beam light entrance parts $31B_1$ to $31B_3$ are arranged in a state in which optical axes $AX_{31B1}$ to $AX_{31B3}$ thereof are inclined with respect to the horizontal direction such that the second light Ray2 entering from each of the high-beam light entrance parts $31B_1$ to $31B_3$ is condensed in the vicinity of the optical axis $AX_{20}$ of the projection lens 20 in the horizontal direction.

Figure 5:
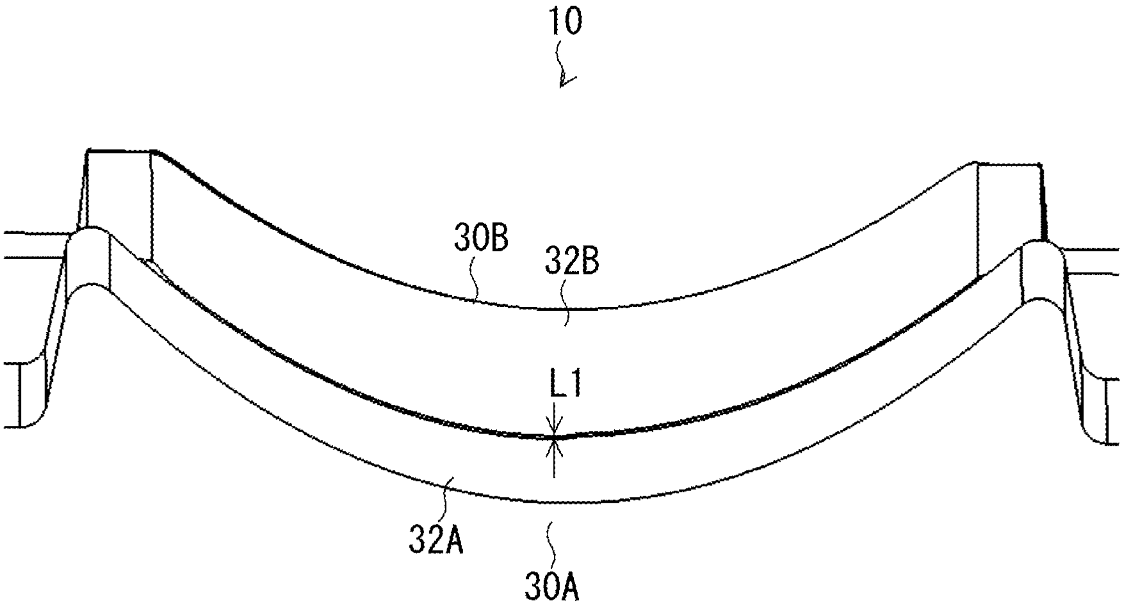
FIG. 5 is a perspective view of the low-beam light guide lens 30A (low-beam light exiting surface 32A) and the high-beam light guide lens 30B (high-beam light exiting surface 32B) when viewed from an oblique direction.

As illustrated in FIG. 3, the high-beam light exiting surface 32B is curved along the rear focal plane $FP_{20}$ (field curvature) of the projection lens 20 in plan view. At this time, as illustrated in FIGS. 1 and 5, the high-beam light exiting surface 32B is disposed closer to the projection lens 20 by a distance L1 than the low-beam light exiting surface 32A (and the rear focal plane $FP_{20}$ (field curvature) of the projection lens 20). As a result, a lower end portion of a high-beam light distribution pattern and an upper end portion of the low-beam light distribution pattern can overlap each other. This point will be further described later. FIG. 5 is a perspective view of the low-beam light guide lens 30A (low-beam light exiting surface 32A) and the high-beam light guide lens 30B (high-beam light exiting surface 32B) when viewed from an oblique direction.

As illustrated in FIG. 4, an upper edge 32B1 of the high-beam light exiting surface 32B includes a cutoff shape 32B2 (Z-type step portion) corresponding to a cutoff line $CL_{Hi}$ (see FIG. 6B) which is a lower edge of a high-beam light distribution pattern $P_{Hi}$.

Figure 6A:
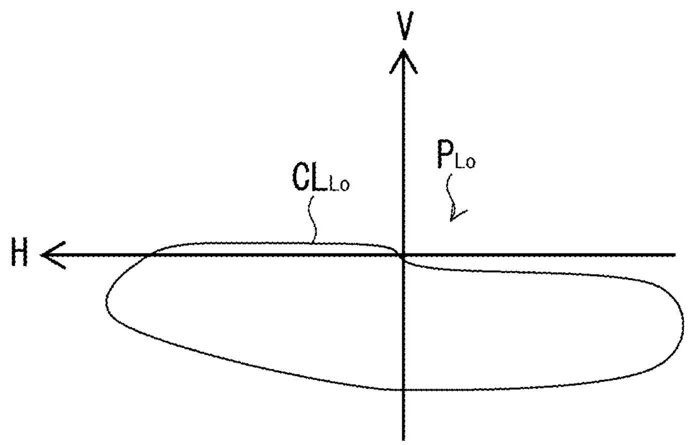
FIG. 6A illustrates an example of a low-beam light distribution pattern $P_{Lo}$ formed by the vehicle lamp fitting 10.
Figure 6B:
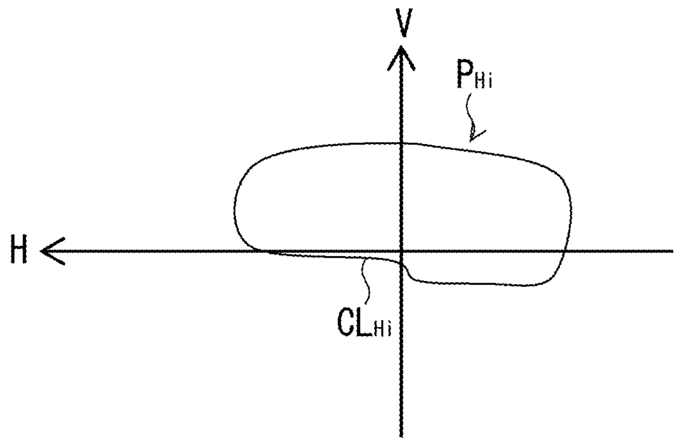
FIG. 6B illustrates an example of a high-beam light distribution pattern $P_{Hi}$ formed by the vehicle lamp fitting 10.
Figure 6C:
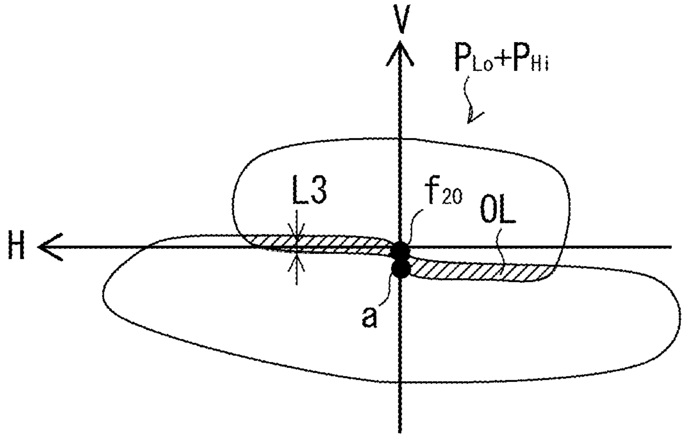
FIG. 6C illustrates an example of a combined light distribution pattern $P_{Lo}+P_{Hi}$ obtained by combining the low-beam light distribution pattern $P_{Lo}$ and the high-beam light distribution pattern $P_{Hi}$ formed by the vehicle lamp fitting 10.

FIG. 6A illustrates an example of the low-beam light distribution pattern $P_{Lo}$ formed by the vehicle lamp fitting 10. Each of the light distribution patterns illustrated in FIGS. 6A to 6C is formed on a virtual vertical screen (disposed about 25 m ahead of a vehicle front surface) facing the vehicle front surface.

The low-beam light distribution pattern $P_{Lo}$ illustrated in FIG. 6A is formed as follows.

First, the low-beam light sources $40A_1$ to $40A_4$ are turned on. For example, the first light Ray1 (see FIG. 1) emitted by the low-beam light source $40A_1$ enters the low-beam light guide lens 30A from the low-beam light entrance part $31A_1$ facing the low-beam light source $40A_1$. The partial light Ray1*a* of the first light Ray1 entering from the low-beam light entrance part $31A_1$ is totally reflected by the lower surface 33A1 of the low-beam light guide part 33A and turned back, and exits from a region in the vicinity of the lower edge 32Al of the low-beam light exiting surface 32A and in the vicinity of the optical axis $AX_{20}$ of the projection lens 20, while the other partial light Ray1*b* directly exits from the low-beam light exiting surface 32A (see FIG. 1). The same applies to the first light Ray1 emitted by the low-beam light sources $40A_2$ to $40A_4$. As a result, the first luminous intensity distribution p1 (see FIG. 1) is formed on the low-beam light exiting surface 32A (in the vicinity of the rear focal plane $FP_{20}$ (field curvature)). The first luminous intensity distribution p1 has a relatively high luminous intensity in the vicinity of a lower edge thereof and in the vicinity of the optical axis $AX_{20}$ of the projection lens 20. The first luminous intensity distribution p1 corresponds to the low-beam light distribution pattern $P_{Lo}$ (see FIG. 6A). The lower surface 33A1 of the low-beam light guide part 33A is a total reflection surface extending rearward from the lower edge of the low-beam light exiting surface 32A.

When the first luminous intensity distribution p1 is inverted and projected forward by the projection lens 20, the low-beam light distribution pattern $P_{Lo}$ is formed as illustrated in FIG. 6A. In the low-beam light distribution pattern $P_{Lo}$, regions in the vicinity of the cutoff line $CL_{Lo}$ and in the vicinity of an intersection of an H line and a V line are relatively bright and excellent in long-distance visibility.

FIG. 6B illustrates an example of the high-beam light distribution pattern $P_{Hi}$ formed by the vehicle lamp fitting 10.

The high-beam light distribution pattern $P_{Hi}$ illustrated in FIG. 6B is formed as follows.

First, the high-beam light sources $40B_1$ to $40B_3$ are turned on. For example, the second light Ray2 (see FIG. 1) emitted by the high-beam light source $40B_1$ enters the high-beam light guide lens 30B from the high-beam light entrance part $31B_1$ facing the high-beam light source $40B_1$. The partial light Ray2*a* of the second light Ray2 entering from the high-beam light entrance part $31B_1$ is totally reflected by the upper surface 33B1 of the high-beam light guide part 33B and turned back, and exits from a region in the vicinity of the upper edge 32B1 of the high-beam light exiting surface 32B and in the vicinity of the optical axis $AX_{20}$ of the projection lens 20, while the other partial light Ray2*b* directly exits from the high-beam light exiting surface 32B (see FIG. 1). The same applies to the second light Ray2 emitted by the high-beam light sources $40B_2$ and $40B_3$. As a result, a second luminous intensity distribution p2 (see FIG. 1) is formed on the high-beam light exiting surface 32B (in the vicinity of the rear focal plane $FP_{20}$ (field curvature)). The second luminous intensity distribution p2 has a relatively high luminous intensity in the vicinity of an upper edge thereof and in the vicinity of the optical axis $AX_{20}$ of the projection lens 20. The second luminous intensity distribution p2 corresponds to the high-beam light distribution pattern $P_{Hi}$ (see FIG. 6B). The upper surface 33B1 of the high-beam light guide part 33B is a total reflection surface extending rearward from the upper edge of the high-beam light exiting surface 32B.

The second luminous intensity distribution p2 is inverted and projected forward by the projection lens 20 to form the high-beam light distribution pattern $P_{Hi}$ as illustrated in FIG. 6B. In the high-beam light distribution pattern $P_{Hi}$, regions in the vicinity of the cutoff line $CL_{Hi}$ and in the vicinity of an intersection of an H line and a V line are relatively bright and excellent in long-distance visibility.

FIG. 6C illustrates an example of a combined light distribution pattern $P_{Lo}+P_{Hi}$ obtained by combining the low-beam light distribution pattern $P_{Lo}$ and the high-beam light distribution pattern $P_{Hi}$ formed by the vehicle lamp fitting 10.

The combined light distribution pattern $P_{Lo}+P_{Hi}$ illustrated in FIG. 6C is formed by inverting and projecting the first luminous intensity distribution p1 and the second luminous intensity distribution p2 forward by the projection lens 20, the first luminous intensity distribution p1 and the second luminous intensity distribution p2 being formed by simultaneously turning on the low-beam light sources $\mathbf{40}A_1$ to $\mathbf{40}A_4$ and the high-beam light sources $\mathbf{40}B_1$ to $\mathbf{40}B_3$.

In FIG. 6C, a black circle denoted by Reference Sign $f_{20}$ represents a position corresponding to the focal point $F_{20}$ (see FIG. 1) of the projection lens 20, and a black circle denoted by Reference Sign a represents a position corresponding to a black circle denoted by Reference Sign A in FIG. 1.

As illustrated in FIG. 6C, the combined light distribution pattern $P_{Lo}+P_{Hi}$ includes an overlapping region OL in which the lower end portion of the high-beam light distribution pattern $P_{Hi}$ and the upper end portion of the low-beam light distribution pattern $P_{Lo}$ overlap with each other.

The reason why the light distribution patterns overlap with each other as described above is that the high-beam light exiting surface 32B is disposed closer to the projection lens 20 by the distance L1 than the low-beam light exiting surface 32A (and the rear focal plane $FP_{20}$ (field curvature) of the projection lens 20) as illustrated in FIGS. 1 and 5. That is, the second luminous intensity distribution p2 is formed closer to the projection lens 20 than the first luminous intensity distribution p1 by the distance L1.

That is, since the high-beam light exiting surface 32B is disposed closer to the projection lens 20 by the distance L1 than the low-beam light exiting surface 32A (and the rear focal plane $FP_{20}$ (field curvature) of the projection lens 20), when viewed from the projection lens 20, second light $\mathbf{Ray2}_{OL}$ (see FIG. 1) exiting from the vicinity of the upper edge 32B1 of the high-beam light exiting surface 32B appears as the first light Ray1 exiting from a region L2 between the black circle A (see FIG. 1) of the low-beam light exiting surface 32A and the focal point $F_{20}$ of the projection lens 20. Therefore, the overlapping region OL in which the lower end portion of the high-beam light distribution pattern $P_{Hi}$ and the upper end portion of the low-beam light distribution pattern $P_{Lo}$ overlap with each other is formed. The overlapping region OL is relatively brighter than the surroundings. Therefore, the combined light distribution pattern $P_{Lo}+P_{Hi}$ has excellent long-distance visibility.

A width L3 (see FIG. 6C) of the overlapping region OL can be freely adjusted by changing the distance L1. The distance L1 is desirably set to such a length that the dark portion between the low-beam light distribution pattern $P_{Lo}$ and the high-beam light distribution pattern $P_{Hi}$ is reduced. Further, it is more desirable to set the distance L1 such that the overlapping region OL is formed not only above the horizontal line H but also below the horizontal line H. In this way, a road surface can be irradiated brighter by the overlapping region OL.

An effect of disposing the high-beam light exiting surface 32B closer to the projection lens 20 by the distance L1 than the low-beam light exiting surface 32A (and the rear focal plane $FP_{20}$ (field curvature) of the projection lens 20) as described above will be further described using a vehicle lamp fitting of a comparative example.

The vehicle lamp fitting of the comparative example has the same configuration as the vehicle lamp fitting 10 of the above embodiment except that the distance L1 (see FIG. 1) between the low-beam light exiting surface 32A and the high-beam light exiting surface 32B is 0 (0).

Figure 7:
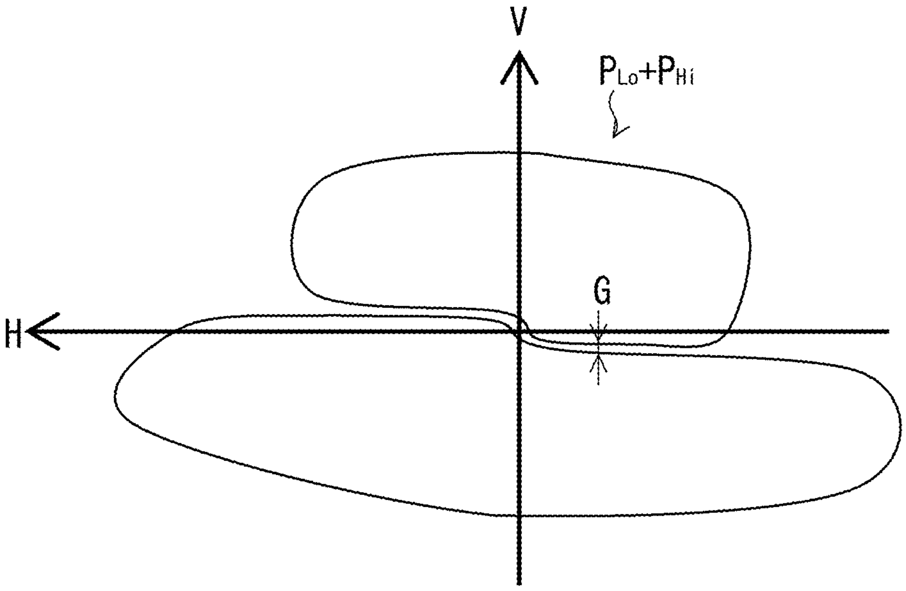
FIG. 7 illustrates an example of a combined light distribution pattern $P_{Lo}+P_{Hi}$ obtained by combining a low-beam light distribution pattern $P_{Lo}$ and a high-beam light distribution pattern $P_{Hi}$ formed by a vehicle lamp fitting of a comparative example.

FIG. 7 illustrates an example of a combined light distribution pattern $P_{Lo}+P_{Hi}$ obtained by combining a low-beam light distribution pattern $P_{Lo}$ and a high-beam light distribution pattern $P_{Hi}$ formed by the vehicle lamp fitting of the comparative example.

Referring to FIG. 7, it can be seen that a dark portion G (a dark portion relatively darker than the surroundings) is formed between the low-beam light distribution pattern $P_{Lo}$ and the high-beam light distribution pattern $P_{Hi}$ formed by the vehicle lamp fitting of the comparative example.

On the other hand, in the vehicle lamp fitting 10 of the present embodiment, it can be seen that the dark portion G is not formed, because the overlapping region OL relatively brighter than the surroundings is disposed between the low-beam light distribution pattern $P_{Lo}$ and the high-beam light distribution pattern $P_{Hi}$ (see FIG. 6C).

A condition (the distance L1, see FIG. 1) for reducing the dark portion G between the low-beam light distribution pattern and the high-beam light distribution pattern varies depending on, for example, a size of each of the projection lens 10, the low-beam light guide lens 30A, the high-beam light guide lens 30B, the low-beam light source 40A, and the high-beam light source 40B, and each of the number of low-beam light sources 40A and the number of high-beam light sources 40B. Therefore, it is difficult to express the condition (the distance L1, see FIG. 1) for reducing the dark portion G between the low-beam light distribution pattern and the high-beam light distribution pattern by a specific numerical value.

However, the condition (the distance L1, see FIG. 1) for reducing the dark portion G between the low-beam light distribution pattern and the high-beam light distribution pattern is changed (adjusted) by using predetermined simulation software, and the combined light distribution pattern $P_{Lo}+P_{Hi}$ (overlapping region OL) is confirmed every time the condition is changed, whereby the condition (the distance L1, see FIG. 1) for reducing the dark portion G between the low-beam light distribution pattern and the high-beam light distribution pattern can be found.

As described above, according to the present embodiment, it is possible to reduce the dark portion between the low-beam light distribution pattern $P_{Lo}$ and the high-beam light distribution pattern $P_{Hi}$ while preventing the light exiting from the high-beam light guide lens 30B from passing through a part of the low-beam light guide lens 30A.

This is because the high-beam light exiting surface 32B is disposed closer to the projection lens 20 by the distance L1 than the low-beam light exiting surface 32A (and the rear focal plane $FP_{20}$ (field curvature) of the projection lens 20). That is, the second luminous intensity distribution p2 is formed closer to the projection lens 20 than the first luminous intensity distribution p1 by the distance L1.

That is, since the high-beam light exiting surface 32B is disposed closer to the projection lens 20 by the distance L1 than the low-beam light exiting surface 32A (and the rear focal plane $FP_{20}$ (field curvature) of the projection lens 20), when viewed from the projection lens 20, second light $\mathbf{Ray2}_{OL}$ (see FIG. 1) exiting from the vicinity of the upper edge 32B1 of the high-beam light exiting surface 32B appears as the first light Ray1 exiting from a region L2 between the black circle A (see FIG. 1) of the low-beam light exiting surface 32A and the focal point $F_{20}$ of the projection lens 20. Therefore, the overlapping region OL in which the lower end portion of the high-beam light distribution pattern $P_{Hi}$ and the upper end portion of the low-beam light distribution pattern $P_{Lo}$ overlap with each other is formed. The overlapping region OL is relatively brighter than the surroundings. Therefore, the dark portion between the low-beam light distribution pattern $P_{Lo}$ and the high-beam light distribution pattern $P_{Hi}$ can be reduced. As a result, the combined light distribution pattern $P_{Lo}+P_{Hi}$ has improved light distribution feeling and excellent long-distance visibility.

In addition, according to the present embodiment, since the second light exiting from the high-beam light guide lens 30B does not pass through a part of the low-beam light guide lens 30A, a decrease in maximum luminous intensity is suppressed as compared with the vehicle lamp fitting described in Patent Literature 1.

Further, according to the present embodiment, the road surface can be irradiated brighter by the overlapping region OL relatively brighter than the surroundings.

As described above, according to the present embodiment, it is possible to simultaneously implement the reduction of the dark portion between the low-beam light distribution pattern $P_{Lo}$ and the high-beam light distribution pattern $P_{Hi}$, the suppression of the decrease in maximum luminous intensity, and the brighter irradiation of the road surface by the overlapping region OL.

Next, a modified example will be described.

In the above embodiment, an example in which the low-beam light guide lens 30A is used as the first luminous intensity distribution forming means and the high-beam light guide lens 30B is used as the second luminous intensity distribution forming means has been described, but the present invention is not limited thereto.

For example, at least one of the first luminous intensity distribution forming means and the second luminous intensity distribution forming means may be a matrix light source including a semiconductor light emitting element group.

Therefore, the luminous intensity distribution (the first luminous intensity distribution p1 or the second luminous intensity distribution p2) can be formed by individually controlling an on/off state (including a dimming state) of the semiconductor light emitting element group.

For example, at least one of the first luminous intensity distribution forming means and the second luminous intensity distribution forming means may be a screen member (for example, a phosphor plate) in which the luminous intensity distribution (the first luminous intensity distribution p1 or the second luminous intensity distribution p2) is formed by light (for example, laser light) with which scanning is performed by an optical deflector (for example, an optical deflector using a MEMS mirror). In this way, the luminous intensity distribution (the first luminous intensity distribution p1 or the second luminous intensity distribution p2) can be formed by controlling the optical deflector or the like.

For example, at least one of the first luminous intensity distribution forming means and the second luminous intensity distribution forming means may be a digital mirror device (DMD) including a micromirror group. Therefore, the luminous intensity distribution (the first luminous intensity distribution p1 or the second luminous intensity distribution p2) can be formed by individually controlling the micromirror group or the like.

In the above embodiment, an example in which the projection lens 20 whose rear focal plane $FP_{20}$ is curved (field curvature) is used has been described, but the present invention is not limited thereto. For example, a projection lens (one or more projection lenses) whose rear focal plane $FP_{20}$ has a planar shape may be used.

The numerical values illustrated in the above embodiment are examples, and it is a matter of course that appropriate different numerical values can be used.

The above embodiment is merely an example in all respects. The present invention is not to be construed as being limited by the description of the above embodiment. The present invention can be implemented in various other forms without departing from the spirit or main characteristics thereof.

This application claims priority based on Japanese Patent Application No. 2023-006022 filed on Jan. 18, 2023, the entire disclosure of which is incorporated herein.

REFERENCE SIGNS LIST

10 VEHICLE LAMP FITTING
20 PROJECTION LENS
30A LOW-BEAM LIGHT GUIDE LENS
30B HIGH-BEAM LIGHT GUIDE LENS
31A LOW-BEAM LIGHT ENTRANCE PART
31A1 CENTRAL LIGHT ENTRANCE SURFACE
31A2 PERIPHERAL LIGHT ENTRANCE SURFACE
31A3 PERIPHERAL REFLECTION SURFACE
31B HIGH-BEAM LIGHT ENTRANCE PART
31B1 CENTRAL LIGHT ENTRANCE SURFACE
31B2 PERIPHERAL LIGHT ENTRANCE SURFACE
31B3 PERIPHERAL REFLECTION SURFACE
32A LOW-BEAM LIGHT EXITING SURFACE
32A1 LOWER EDGE
32A2 CUTOFF SHAPE
32B HIGH-BEAM LIGHT EXITING SURFACE
32B1 UPPER EDGE
32B2 CUTOFF SHAPE
33A LOW-BEAM LIGHT GUIDE PART
33A1 LOWER SURFACE
33B HIGH-BEAM LIGHT GUIDE PART
33B1 UPPER SURFACE
40 LOW-BEAM LIGHT SOURCE
40A LOW-BEAM LIGHT SOURCE
40$A_1$ to 40$A_4$ LOW-BEAM LIGHT SOURCE
40B HIGH-BEAM LIGHT SOURCE
40$B_1$ to 40$B_3$ HIGH-BEAM LIGHT SOURCE
50 SUBSTRATE
50*a* LIGHT SOURCE MOUNTING SURFACE
$AX_{20}$ OPTICAL AXIS
$AX_{31A1}$ OPTICAL AXIS
$AX_{31B1}$ OPTICAL AXIS
$AX_{40A1}$ OPTICAL AXIS
$AX_{40B1}$ OPTICAL AXIS
$CL_{Hi}$ CUTOFF LINE
$CL_{Lo}$ CUTOFF LINE
$F_{20}$ FOCAL POINT
$FP_{20}$ REAR FOCAL PLANE
G DARK PORTION
OL OVERLAPPING REGION
$P_{Hi}$ HIGH-BEAM LIGHT DISTRIBUTION PATTERN
$P_{Lo}$ LOW-BEAM LIGHT DISTRIBUTION PATTERN
Ray1 FIRST LIGHT
Ray2 SECOND LIGHT
p1 FIRST LUMINOUS INTENSITY DISTRIBUTION
p2 SECOND LUMINOUS INTENSITY DISTRIBUTION

The invention claimed is:

1. A vehicle lamp fitting comprising:

a projection lens;

first luminous intensity distribution forming means for forming a first luminous intensity distribution corresponding to a low-beam light distribution pattern above a focal point of the projection lens; and second luminous intensity distribution forming means for forming a second luminous intensity distribution corresponding to a high-beam light distribution pattern below the focal point of the projection lens, wherein the focal point of the projection lens is disposed in a vicinity of a lower edge of the first luminous intensity distribution, the projection lens projects the first luminous intensity distribution and the second luminous intensity distribution to form the low-beam light distribution pattern and the high-beam light distribution pattern, and the second luminous intensity distribution is formed closer to the projection lens than the first luminous intensity distribution such that a lower end portion of the high-beam light distribution pattern overlaps with an upper end portion of the low-beam light distribution pattern.

2. The vehicle lamp fitting according to claim 1, wherein the first luminous intensity distribution has a relatively high luminous intensity in a vicinity of a lower edge of the first luminous intensity distribution, and the second luminous intensity distribution has a relatively high luminous intensity in a vicinity of an upper edge of the second luminous intensity distribution.

3. The vehicle lamp fitting according to claim 2, wherein the lower edge of the first luminous intensity distribution includes a cutoff shape corresponding to a cutoff line which is an upper edge of the low-beam light distribution pattern, and the upper edge of the second luminous intensity distribution includes a cutoff shape corresponding to a cutoff line which is a lower edge of the high-beam light distribution pattern.

4. The vehicle lamp fitting according to claim 1, wherein the first luminous intensity distribution forming means is a low-beam light guide lens including a low-beam light exiting surface disposed above the focal point of the projection lens, and a low-beam light guide part configured to guide first light exiting from the low-beam light exiting surface to the low-beam light exiting surface, the first luminous intensity distribution is formed on the low-beam light exiting surface by the first light exiting from the low-beam light exiting surface, the second luminous intensity distribution forming means is a high-beam light guide lens including a high-beam light exiting surface disposed below the focal point of the projection lens, and a high-beam light guide part configured to guide second light exiting from the high-beam light exiting surface to the high-beam light exiting surface, the second luminous intensity distribution is formed on the high-beam light exiting surface by the second light exiting from the high-beam light exiting surface, and the high-beam light exiting surface is disposed closer to the projection lens than the low-beam light exiting surface.

5. The vehicle lamp fitting according to claim 4, wherein the low-beam light guide part includes a lower surface that is a total reflection surface extending rearward from a lower edge of the low-beam light exiting surface, and the high-beam light guide part includes an upper surface that is a total reflection surface extending rearward from an upper edge of the high-beam light exiting surface.

6. The vehicle lamp fitting according to claim 5, further comprising:

a low-beam light source disposed behind the low-beam light guide lens and configured to emit the first light; and a high-beam light source disposed behind the high-beam light guide lens and configured to emit the second light, wherein the low-beam light guide lens further includes a low-beam light entrance part which faces the low-beam light source and into which the first light emitted by the low-beam light source enters, the high-beam light guide lens further includes a high-beam light entrance part which faces the high-beam light source and into which the second light emitted by the high-beam light source enters, the low-beam light entrance part is configured such that the first light entering the low-beam light guide lens from the low-beam light entrance part is condensed toward the lower surface of the low-beam light guide part, and the high-beam light entrance part is configured such that the second light entering the high-beam light guide lens from the high-beam light entrance part is condensed toward the upper surface of the high-beam light guide part.

7. The vehicle lamp fitting according to claim 4, wherein the lower edge of the low-beam light exiting surface has a shape corresponding to a cutoff line which is an upper edge of the low-beam light distribution pattern, and the upper edge of the high-beam light exiting surface has a shape corresponding to a cutoff line which is a lower edge of the high-beam light distribution pattern.

8. The vehicle lamp fitting according to claim 1, wherein at least one of the first luminous intensity distribution forming means and the second luminous intensity distribution forming means is a matrix light source including a semiconductor light emitting element group.

9. The vehicle lamp fitting according to claim 1, wherein at least one of the first luminous intensity distribution forming means and the second luminous intensity distribution forming means is a screen member in which the luminous intensity distribution is formed by light with which scanning is performed by an optical deflector.

10. The vehicle lamp fitting according to claim 1, wherein at least one of the first luminous intensity distribution forming means and the second luminous intensity distribution forming means is a digital mirror device (DMD) including a micromirror group.

* * * * *